(12) United States Patent
Billmaier et al.

(10) Patent No.: US 7,155,675 B2
(45) Date of Patent: *Dec. 26, 2006

(54) SYSTEM AND METHOD FOR FOCUSED NAVIGATION WITHIN A USER INTERFACE

(75) Inventors: James A. Billmaier, Woodinville, WA (US); John M. Kellum, Seattle, WA (US); Dewey Reid, San Rafael, CA (US); Philip Rogan, Bozeman, MT (US)

(73) Assignee: Digeo, Inc., Kirkland, WA (US)

( * ) Notice: Subject to any disclaimer, the term of this patent is extended or adjusted under 35 U.S.C. 154(b) by 509 days.

This patent is subject to a terminal disclaimer.

(21) Appl. No.: 10/097,195

(22) Filed: Mar. 12, 2002

(65) Prior Publication Data

US 2003/0132971 A1 Jul. 17, 2003

Related U.S. Application Data

(60) Provisional application No. 60/324,997, filed on Sep. 26, 2001, provisional application No. 60/317,612, filed on Sep. 6, 2001, provisional application No. 60/315,731, filed on Aug. 29, 2001.

(51) Int. Cl.
*H04N 7/25* (2006.01)

(52) U.S. Cl. .................. 715/720; 715/719; 715/721; 725/39; 725/41; 725/52

(58) Field of Classification Search ............... 345/751; 725/43, 56, 41, 52, 39, 37, 38; 715/721, 715/720, 719, 865
See application file for complete search history.

(56) References Cited

U.S. PATENT DOCUMENTS

| | | | |
|---|---|---|---|
| 5,398,074 A | 3/1995 | Duffield et al. ............. | 348/564 |
| 5,524,195 A | 6/1996 | Clanton, III et al. ........ | 395/155 |
| 5,602,596 A | 2/1997 | Claussen et al. ............ | 348/564 |
| 5,606,374 A | 2/1997 | Bertram ...................... | 348/565 |
| 5,621,456 A | 4/1997 | Florin et al. .................... | 348/7 |
| 5,623,613 A | 4/1997 | Rowe et al. ................ | 395/353 |
| 5,663,757 A | 9/1997 | Morales ....................... | 348/83 |
| 5,673,401 A * | 9/1997 | Volk et al. ................... | 725/139 |

(Continued)

FOREIGN PATENT DOCUMENTS

EP   1 028 570 A1   8/2000

OTHER PUBLICATIONS

Nokia Mediaterminal 5115; www.nokia.com/multimedia/pdf/mediaterminal.pdf; pp. 1-12; Dec. 11, 2001.

(Continued)

*Primary Examiner*—Kristine Kincaid
*Assistant Examiner*—Dennis G. Bonshock
(74) *Attorney, Agent, or Firm*—Kory D. Christensen; Stoel Rives, LLP

(57) ABSTRACT

An information system having a plurality of user options is provided. A graphical representation is uniquely associated with each user option. In response to a single user action, the graphical representations are successively displayed in a focus area within the display screen. When the user sees a graphical representation of a desired option, the user takes some additional action and the successive display of graphical representations is discontinued. The graphical representation of the desired user option is then displayed in the focus area within the display screen, and may be visually enhanced. Once navigation has been discontinued, the user may select the user option associated with the displayed graphical representation.

59 Claims, 6 Drawing Sheets

U.S. PATENT DOCUMENTS

| | | | | |
|---|---|---|---|---|
| 5,677,708 | A | | 10/1997 | Matthews, III et al. ..... 345/115 |
| 5,682,511 | A | * | 10/1997 | Sposato et al. ............. 345/716 |
| 5,812,124 | A | | 9/1998 | Eick et al. .................. 345/327 |
| 5,838,326 | A | | 11/1998 | Card et al. .................. 345/355 |
| 5,850,218 | A | | 12/1998 | LaJoie et al. ............... 345/327 |
| 6,005,601 | A | | 12/1999 | Ohkura et al. .................. 348/7 |
| 6,020,930 | A | | 2/2000 | Legrand ..................... 348/569 |
| 6,028,600 | A | | 2/2000 | Rosin et al. ................. 345/327 |
| 6,151,059 | A | * | 11/2000 | Schein et al. .................. 725/37 |
| 6,163,345 | A | | 12/2000 | Noguchi et al. ............. 348/564 |
| 6,188,406 | B1 | | 2/2001 | Fong et al. .................. 345/348 |
| 6,266,059 | B1 | | 7/2001 | Matthews, III et al. ..... 345/352 |
| 6,266,098 | B1 | | 7/2001 | Cove et al. .................. 348/563 |
| 6,281,940 | B1 | * | 8/2001 | Sciammarella ............. 348/564 |
| 6,313,851 | B1 | | 11/2001 | Matthews, III et al. ..... 345/718 |
| 6,344,880 | B1 | | 2/2002 | Takahashi et al. .......... 348/563 |
| 6,425,129 | B1 | * | 7/2002 | Sciammarella et al. ....... 725/38 |
| 6,538,672 | B1 | | 3/2003 | Dobbelaar .................. 345/810 |
| 6,613,100 | B1 | | 9/2003 | Miller ........................ 715/526 |
| 6,642,939 | B1 | * | 11/2003 | Vallone et al. .............. 345/721 |
| 6,678,891 | B1 | * | 1/2004 | Wilcox et al. ................ 725/42 |
| 6,690,391 | B1 | * | 2/2004 | Proehl et al. ................ 345/720 |
| 6,934,917 | B1 | * | 8/2005 | Lin ............................. 715/811 |
| 2002/0033848 | A1 | | 3/2002 | Sciammarella et al. ..... 345/838 |
| 2002/0056129 | A1 | | 5/2002 | Blackketter et al. ........ 725/112 |
| 2002/0070958 | A1 | | 6/2002 | Yeo et al. ................... 345/723 |
| 2002/0078440 | A1 | | 6/2002 | Feinberg et al. ................ 725/9 |
| 2002/0152474 | A1 | | 10/2002 | Dudkiewicz ............... 725/136 |
| 2003/0052900 | A1 | | 3/2003 | Card et al. .................. 345/660 |
| 2003/0090524 | A1 | | 5/2003 | Segerberg et al. .......... 345/786 |
| 2003/0093792 | A1 | | 5/2003 | Labeeb et al. ................ 725/46 |

OTHER PUBLICATIONS

Nokia Mediamaster 9470S; http://www.digitv.de/ifa01/nokia9470s.shtml;pp. 1-2; Dec. 11, 2001.

U.S. Appl. No. 10/097,174, filed Mar. 12, 2002, Billmaier et al.
U.S. Appl. No. 10/105,088, filed Mar. 22, 2002, Billmaier.
U.S. Appl. No. 10/105,083, filed Mar. 22, 2002, Billmaier.
U.S. Appl. No. 10/108,178, filed Mar. 27, 2002, Billmaier et al.
U.S. Appl. No. 10/113,889, filed Mar. 29, 2002, Billmaier et al.
U.S. Appl. No. 10/107,601, filed Mar. 27, 2002, Billmaier et al.
U.S. Appl. No. 10/113,820, filed Mar. 29, 2002, Billmaier et al.
U.S. Appl. No. 10/186,209, filed Jun. 27, 2002, Istvan et al.
U.S. Appl. No. 10/186,210, filed Jun. 27, 2002, Billmaier et al.
U.S. Appl. No. 10/230,964, filed Aug. 29, 2002, Istvan et al.
U.S. Appl. No. 10/260,700, filed Sep. 30, 2002, Billmaier et al.
U.S. Appl. No. 10/270,738, filed Sep. 30, 2002.
U.S. Appl. No. 10/260,208, filed Sep. 30, 2002, Billmaier et al.
U.S. Appl. No. 10/328,754, filed Dec. 23, 2002, Rappaport et al.
U.S. Appl. No. 10/259,199, filed Sep. 27, 2002, Young et al.
U.S. Appl. No. 10/138,810, filed May 3, 2002, Billmaier et al.
U.S. Appl. No. 10/138,805, filed May 3, 2002, Billmaier et al.
U.S. Appl. No. 10/138,803, filed May 3, 2002, Billmaier et al.
U.S. Appl. No. 10/183,804, filed May 3, 2002, Billmaier et al.
U.S. Appl. No. 60/317,612, filed Sep. 6, 2001, Reid et al.
U.S. Appl. No. 60/324,997, filed Sep. 26, 2001, Reid et al.
U.S. Appl. No. 10/186,094, filed Jun. 29, 2002, Billmaier et al.
U.S. Appl. No. 10/187,118, filed Jun. 29, 2002, Billmaier et al.
U.S. Appl. No. 10/186,095, filed Jun. 29, 2002, Billmaier et al.
U.S. Appl. No. 60/377,627, filed May 3, 2002, Billmaier et al.
U.S. Appl. No. 29/161,708, filed Jun. 3, 2002, Nguyen et al.
U.S. Appl. No. 10/251,366, filed Sep. 20, 2002, Allen et al.
U.S. Appl. No. 10/260,881, filed Sep. 30, 2002, Allen et al.
U.S. Appl. No. 10/320,900, filed Dec. 16, 2002, Kolde et al.
U.S. Appl. No. 10/328,514, filed Dec. 23, 2002, Kolde et al.
U.S. Appl. No. 10/260,738, filed Sep. 30, 2002, Billmaier et al.

* cited by examiner

SYSTEM AND METHOD FOR FOCUSED NAVIGATION WITHIN A USER INTERFACE

RELATED APPLICATIONS

The present application is related to and claims priority from U.S. Provisional Application No. 60/315,731, filed Aug. 29, 2001, entitled "System and Method for Visual Channel Surfing", which is hereby incorporated by reference in its entirety. The present application is also related to and claims priority from U.S. Provisional Application No. 60/317,612, filed Sep. 6, 2001, entitled "System and Method for Visual Channel Surfing", which is hereby incorporated by reference in its entirety. The present application is further related to and claims priority from U.S. Provisional Application No. 60/324,997, filed Sep. 26, 2001, entitled "System and Method for Visual Channel Surfing Using Center-Focused Navigation", which is hereby incorporated by reference in its entirety.

BACKGROUND

FIELD OF THE INVENTION

The present invention relates generally to information systems. More specifically, the present invention relates to a system and method for focused navigation within a user interface.

DESCRIPTION OF RELATED BACKGROUND ART

Recent advances in technology have vastly increased the number of available user options within information systems, such as personal computers (PCs), interactive television (ITV) systems, personal digital assistant (PDAs), cellular telephones, and the like. For instance, ITV systems now offer hundreds of broadcast channels and a variety of interactive options, including e-mail, videoconferencing, instant messaging, online banking, online purchasing, and so forth.

Unfortunately, despite the rapid advances in information systems, user interfaces for these systems remain largely unchanged. Navigating through all of these new options is no easy task. For example, a user of a modern ITV system must scan through user options and channels in much the same way as a user selected a TV channel twenty years ago, i.e. by repeatedly pressing channel up/down buttons on a remote control. Such an outdated approach is far too slow and inconvenient to facilitate effective navigation of a modern ITV system.

Similar problems exist with PC interfaces. The graphical user interface (GUI) of a modern PC looks remarkably similar to the first GUI developed twenty years ago. Small icons representing user options are arranged in rows and columns on a desktop. Many of the icons are identical, requiring the addition of textual labels as a distinguishing feature. Typically, a user must individually examine each icon and read each label—a time-consuming process that does not lend itself to effective navigation of the numerous options available in a modern PC.

Accordingly, it would be an advancement in the art to provide a user interface that allows for rapid and efficient navigation of a plurality of user options without the drawbacks of conventional approaches. In particular, it would be an advancement in the art to provide a user interface in which a user need not repeatedly press a button to display each available option, as is often the case with a conventional television or ITV interface. Likewise, it would be an advancement in the art to provide a user interface in which a user need not scan through an arrangement of icons on a desktop, as is the case in many conventional PC interfaces.

BRIEF DESCRIPTION OF THE DRAWINGS

Non-exhaustive embodiments of the invention are described with reference to the figures, in which.

DETAILED DESCRIPTION OF THE PREFERRED EMBODIMENTS

Figure 1:
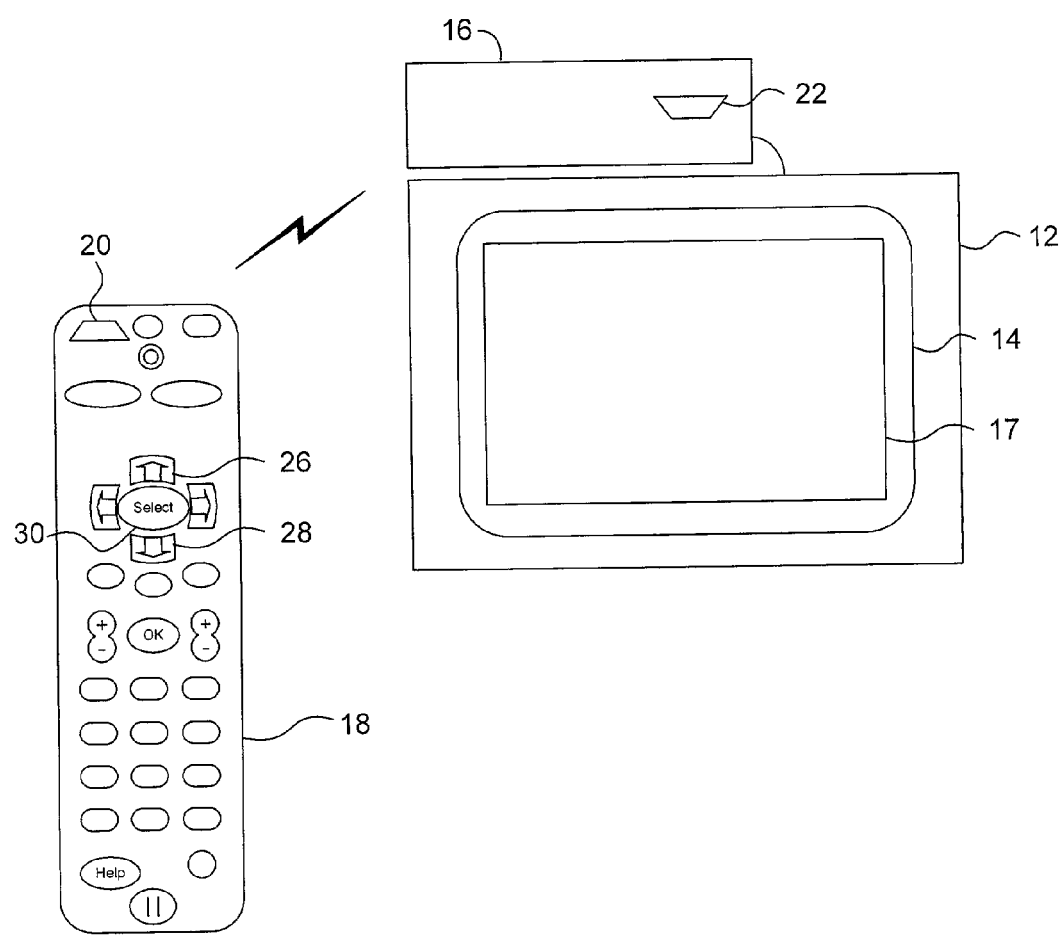
FIG. 1 is an illustration of an ITV system.

The present invention solves the foregoing problems and disadvantages by providing a system and method for focused navigation within a user interface of an information system.

In one implementation, an information system having a plurality of user options is provided. As used herein, a "user option" is any capability of an information system that a user may selectively activate, e.g., application program, database, TV broadcast channel, Interactive Television (ITV) channel, Pay-Per-View (PPV) channel, music channel, program recorded by a Personal Video Recorder (PVR), digital photograph, video clip, audio clip, purchase opportunity, hyperlink, MP3 file, search function or filter, etc. Each user option is uniquely associated with a graphical representation thereof within the information system. The graphical representation may take the form of an icon (e.g., drawing), an image (e.g., photograph or video frame), a symbol, a video clip, or the like. In certain embodiments, text may be combined with the graphical representation for increased clearity.

In response to a single user action, each of the graphical representations corresponding to available options is successively displayed, one at a time, within a focus area. The focus area may be located at a central or visually-dominant location of the user interface, although the invention is not limited in this respect. Because the graphical representations are displayed successively within the focus area, the techniques described herein are referred to "focused navigation" techniques. In other words, a user focuses on a single area of the user interface to view available options, unlike a conventional PC interface.

The graphical representations may be successively displayed at a high rate of speed, preferably within the user's image recognition threshold. For instance, in one embodiment, the graphical representations may be shown at a rate of about between six and eight per second (360–420 per minute). Once all of the graphical representations corresponding to available options are displayed, the cycle may be repeated any number of times until halted by the user.

The single action may be pressing (or pressing and holding down) a button on a remote control, e.g., a channel up or channel down button on an ITV remote control. When displayed within the focus area, the graphical representations are preferably large enough to permit easy user recognition from a comfortable viewing distance for the particular display device. For example, for a television set, the graphical representations may be as large as one-fifth to one-quarter of the total viewing area.

In one embodiment, the rate at which the graphical representations are successively displayed may be increased in response to the user taking a suitable action, such as continuing to hold down the button. For example, the initial display rate may be relatively low, e.g., 1–2 representations per second. However, as the user holds down the button, the rate may increase to a maximum, preferably within the user's image recognition threshold. The rate may accelerate smoothly, or may increase according to a stepwise function, depending on how long the button is held down. Alternatively, the display rate may increase in steps each time a particular button is pressed.

When the user sees the graphical representation of a desired option being displayed, the user takes some additional action and the successive display of graphical representations is discontinued. For example, the additional action may be releasing the button on the remote control or pressing the same or a different button.

If the user's reaction time is fast enough, the graphical representation of the desired option remains visible in the focus area. If not, one or more representations may be subsequently displayed. In such a case, the user may backtrack to the desired graphical representation by repeatedly activating a suitable control. In one embodiment, the user's delayed response may be automatically compensated for by reverting to a previously displayed representation once the user takes the additional action to discontinue navigation.

Once the successive display has been discontinued, the graphical representation remaining on the display screen may be visually enhanced. For example, the displayed representation may be enlarged in one embodiment. Alternatively, the displayed representation may change from a static image to a moving video image.

In one implementation, the user may select the option associated with the displayed graphical representation by taking another action, such as activating a selection control. For instance, the user may select a graphical representation of a broadcast channel by pressing a "select" button on a remote control, which may result in the selected broadcast channel being decoded and displayed.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The present invention may be used in conjunction with any type of information system in which user options may be displayed on a display screen. Examples of such information systems include, but are not limited to, ITV systems, PCs, and mobile computing devices, such as PDAs, webpads, cellular telephones, and the like. However, throughout the following specification, an ITV system will be used as an example. Of course, the invention should not be construed as being limited to ITV systems.

Referring now to FIG. 1, there is shown an illustration of an ITV system 10. The ITV system 10 includes, in one embodiment, a television (TV) 12 (including a display screen 14), a set-top box (STB) 16, and a remote control 18.

The STB 16 is a consumer electronics device that serves as a gateway between the TV 12 and a broadband network (not shown), such as a cable or satellite network. The STB 16 receives TV signals and other information from the broadband network and processes the same for display on the display screen 14. The STB 16 may also be responsible for displaying a graphical user interface (GUI) 17 on the display screen 14.

In alternative embodiments, the term "STB" may broadly encompass a personal computer (PC) that performs STB-like functions. In such an embodiment, a PC may be used to process TV signals and other data received from the broadband network. The PC may operate in the context of a home network to provide display signals to a variety of devices, including one or more television sets, computer monitors, personal digital assistants (PDAs), cellular phones, and the like. A variety of home networking systems and protocols may be used, such as Ethernet, 802.11b, Bluetooth, etc.

The remote control 18 is provided for convenient operation of the STB 16 and the TV 12. The remote control 18 includes a wireless transmitter 20 for transmitting control signals to a wireless receiver 22 within the STB 16. In addition, the remote control 18 includes a number of buttons or other similar controls. For instance, the remote control 18 may include a "Channel-Up" button 26, a "Channel-Down" button 28, and a "Select" button 30. Of course, a variety of other buttons or controls may be provided within the scope of the invention. In alternative implementations, the remote control 18 may be embodied as a keyboard, mouse, or other input device.

Figure 2:
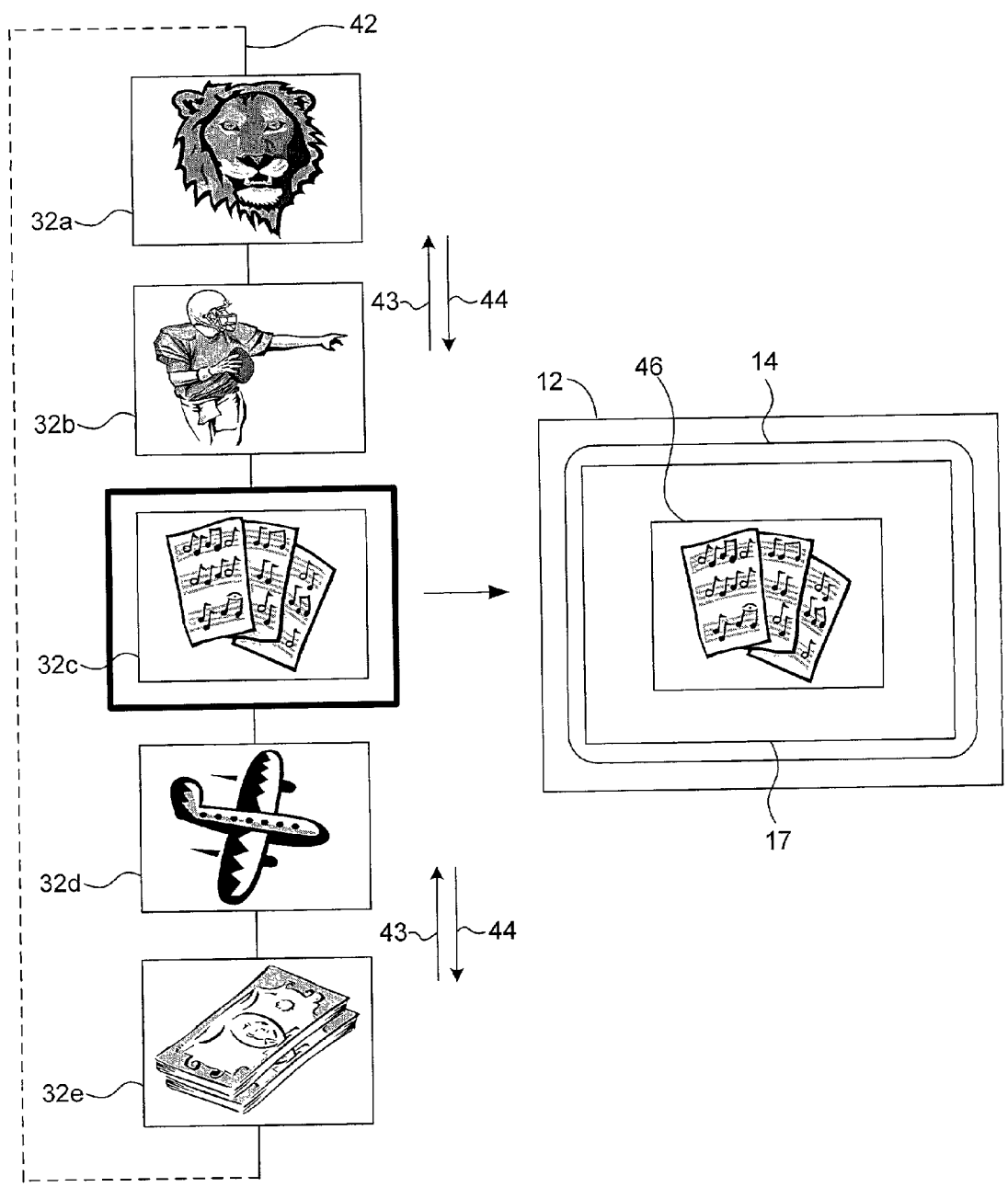
FIGS. 2–3 are illustrations of a focused navigation technique within a user interface.
Figure 3:
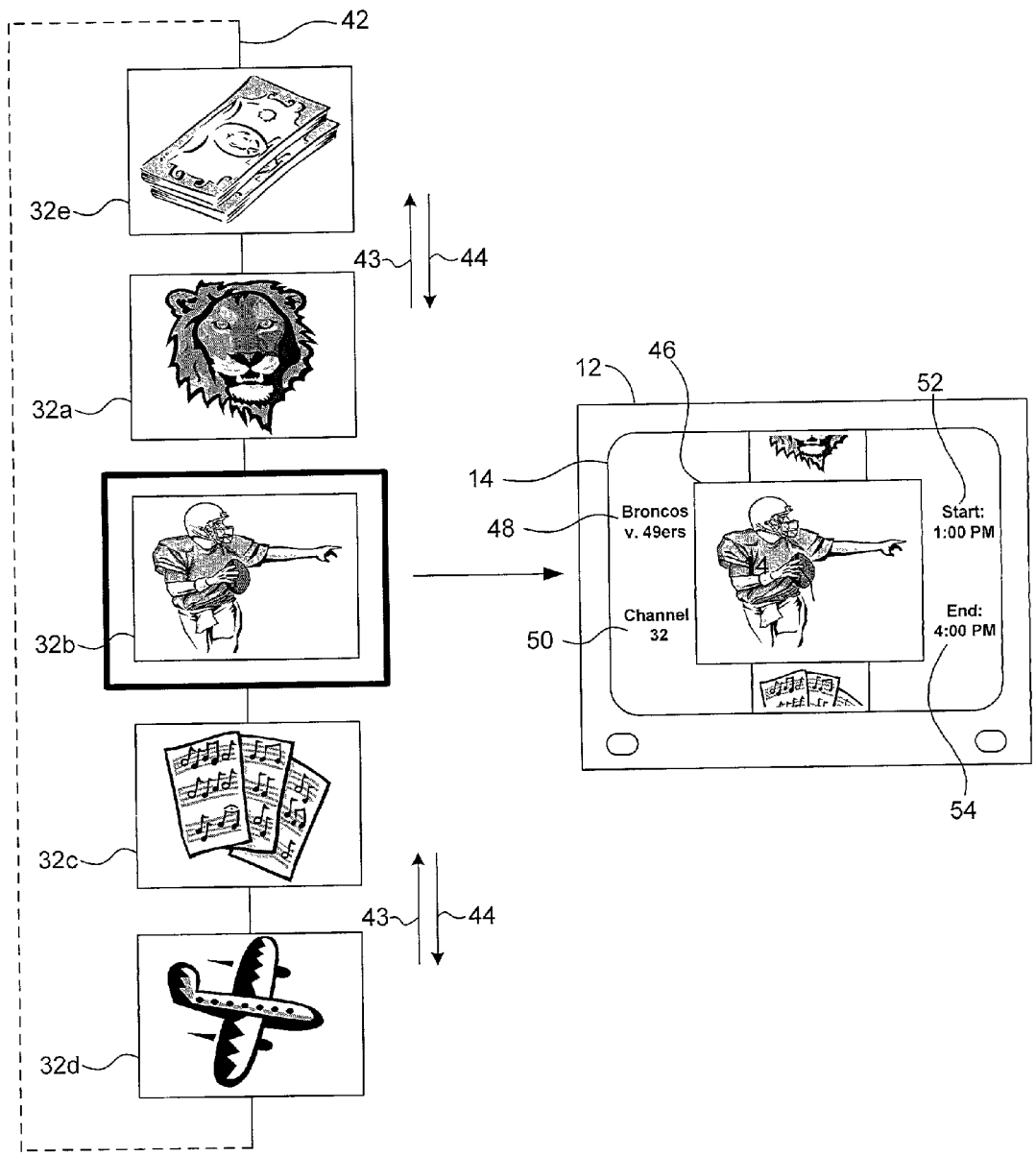

FIGS. 2–3 illustrate embodiments of a technique for focused navigation of user options within a user interface. As previously noted, a user option may be any capability of an information system that a user may selectively activate, e.g., application, file, database, broadcast channel, media program, etc. For simplicity, the user options illustrated throughout the following specification correspond to particular TV channels that may be viewed in the context of an ITV system. However, the invention should not be construed as being limited to TV channels or ITV systems.

The ITV system 10 may have any number of options, each of which has a corresponding graphical representation 32. The graphical representation 32 may take the form of an icon (e.g., a drawing), an image (e.g., a photograph or video frame), a symbol, or the like. The graphical representations 32 may be stored within memory, disk drive, or the like, within the ITV system 10.

In the depicted embodiment, the graphical representations 32 take the form of icons 32. For instance, a lion icon 32*a* may represent a wildlife channel, a football player icon 32*b* may represent a football channel, a music icon 32*c* may represent a music channel, an airplane icon 32*d* may represent a travel channel, and a money icon 32*e* may represent a finance channel. Of course, the icons 32 may be accompanied by descriptive text, numerals, etc.

The icons 32a–e may be linked together or grouped in a particular sequence 42, which may take the form of a closed loop, as illustrated in FIG. 2. Alternatively, the sequence 42 may be linear. The ordering of the sequence 42 may be dictated, for example, by the order of the represented TV channels. Of course, the sequence 42 may be ordered in other ways or may be user-defined.

Within the sequence 42, one graphical representation (e.g., icon 32c) is selected or active. As shown, the selected icon 32c is displayed within in a focus area 46 of the GUI 17 (brought "in focus"). As previously noted, a focus area 46 is a single location of the GUI 17 at which the graphical representations (e.g., icons 32) are successively displayed, e.g., displayed one at a time in sequence. The focus area 46 may be located at a central or visually dominant location of the user interface, although the invention is not limited in this respect. For example, the focus area may be located at the center of the GUI 17 (and/or display screen 14).

In response to a single user action, the sequence 42 of icons 32a–e corresponding to user options are successively displayed within the focus area 46. Where the sequence 42 is a closed loop, the successive display may continue indefinitely until halted by the user.

The icons 32 may be successively displayed at a high rate of speed, preferably within the user's image recognition threshold. The image recognition threshold will vary somewhat from user to user depending on a number of factors, including age, eyesight, and so forth. Typically, however, the image recognition threshold for many users will range between 5 and 8 graphical representations per second. Of course, the display rate may be adjusted for users with unusually high or low image recognition thresholds. For instance, a user may cap the maximum display rate at a preferred value.

In one embodiment, the image recognition threshold may be determined or approximated by initially showing a user a test image and then displaying the test image at a point in a cycling sequence of graphical representations being displayed at a high rate of speed (e.g., >10 representations per second). Thereafter, the display rate may be decreased in steps until the user recognizes the test image and presses a button, such as the "Select" button 30. The display rate at which the user first recognizes the test image may be deemed the user's image recognition threshold.

The single action to initiate navigation may be pressing (or pressing and holding down) a button on the remote control 18. For example, the user may press the "Channel-Up" button 26 to initiate the successive display in a first direction 43 within the sequence 42, and press the "Channel-Down" button 28 to initiate navigation in the opposite direction 44. Alternatively, the user may speak a command into a microphone (either within the STB 16 or remote control 18) to initiate navigation. Of course, the user may initiate navigation in a variety of other ways within the scope of the invention.

Preferably, the icons 32, when displayed within the focus area 46, are sufficiently large to permit user recognition from a comfortable viewing distance for the particular display screen 14. For instance, as shown in FIG. 2, the music icon 32c occupies between about one-fifth and about one-fourth of the display screen 14. Of course, the size of the icons 32 may vary depending on the particular application or display screen 14. For example, the icons 32 may be displayed at a smaller size within a PC user interface than an ITV user interface, because an ITV user is typically positioned farther away from the display screen 14 than a PC user.

In certain embodiments, the previous and/or next icons 32 within the sequence 42 may be displayed adjacent to the focus area 46 or in other locations of the GUI 17. For example, as shown in FIG. 3, a portion of the lion icon 32a appears above the focus area 46, and a portion of the music icon 32c appears below the focus area 46. Of course, the icons 32a and 32c could be displayed to the left or right of the focus area 46 in other embodiments. Displaying the next and/or previous icons 32 provides the user with a better understanding of his or her navigational position within the sequence 42.

In one embodiment, when the user sees an icon 32 being displayed of an option that he or she desires to select, the user takes some additional action and the successive display of icons 32 is discontinued. For example, if the user presses and holds the "Channel-Up" button 26 to initiate navigation, the user may release the "Channel-Up" button 26 to discontinue navigation. In an alternative embodiment, where the successive display was initiated simply by pressing a button, the user may press the same or a different button to halt the successive display. Of course, the user may discontinue navigation in a variety of other ways within the scope of the invention.

Once the successive display has been discontinued, the icon 32 remaining on the display screen 14 may be visually enhanced. For example, with reference to FIG. 3, the remaining icon 32b may be visually enhanced by displaying text in other areas of the GUI 17 that is descriptive of the desired user option. Because the remaining icon 32b in FIG. 3 represents a TV broadcast of a football game, the text may include the teams 48 that are playing, the channel 50 on which the game is being broadcast, the time 52 the game started, the time 54 the game is projected to end, as well as other useful information.

Additionally, the remaining icon 32b may be visually enhanced by enlarging it with respect to the other icons 32 on the display screen 14 and/or with respect to its original size. The enlargement may be accomplished through pixel duplication and/or interpolation. Alternatively, a higher-resolution image may be used.

Alternatively, the remaining icon 32b may be changed from a static picture, image, or video frame to a moving video image, such as a reduced-size version of the television broadcast of the football game. Of course, the remaining icon 32b may be visually enhanced in a number of other ways within the scope of the invention.

In one implementation, the user may select the user option associated with the displayed icon 32 by taking a separate action. The separate action may be activating a selection control on the remote control 18. For example, in response to the user pressing the "Select" button 30, the GUI 17 may be replaced with the television broadcast of the football game. Alternatively, the separate action may simply be waiting a set amount of time without activating any controls on the remote control 18.

Figure 4:
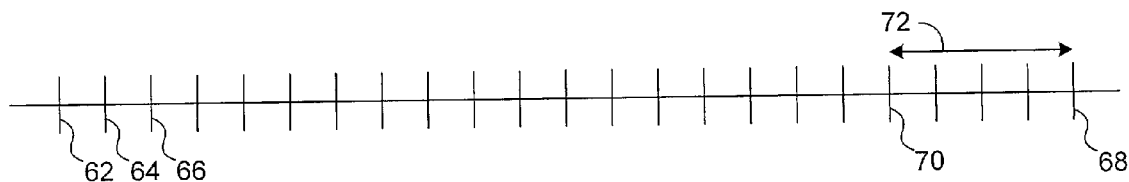
FIGS. 4–6 are timing diagrams for a successive display of graphical representations of available user options.

Referring now to FIG. 4, there is shown a timing diagram illustrating the successive display of icons 32 in accordance with the invention. Each vertical line within the timing diagram represents a moment in time at which a particular icon 32 is displayed. In particular, in response to a single user action, icons are successively displayed at moments 62, 64, 66, and so on. When the user takes some additional action to discontinue navigation, the successive display of icons is halted at moment 68.

If the user's reaction time is fast enough, the icon 32 representing the desired user option remains visible in the focus area 46. However, the user's reaction time may not be fast enough and one or more icons 32 may be subsequently displayed. In such a case, the user may manually backtrack to the desired icon 32 by, for example, repeatedly activating a suitable control on the remote control 18. For example, briefly pressing the "Channel-Up" or "Channel-Down" buttons 26, 28 may result in the previous or next icon 32, respectively, being displayed.

In alternative embodiments, the user's delayed response may be automatically compensated for by reverting to a previously displayed icon 32 once the user halts the display. For example, if an icon 32 representing a desired user option is displayed on the display screen 14 at moment 68, but the user takes the additional action at moment 70, the ITV system 10 may be configured to automatically revert to the icon 32 displayed a set amount of time before the action was taken. The time difference 72 between moments 68 and 70 corresponds to an anticipated time delay between the user's recognition of a desired icon 32 and the user's additional action. Because the actual time delay between recognition and release will vary depending on a number of factors such as age, reaction time, agility, and so forth, it may be desirable to allow a user to adjust the time difference 72. In addition, the time difference 72 may vary depending on the rate at which the icons 32 are being displayed, e.g., a faster rate may require a greater time difference 72.

Figure 5:
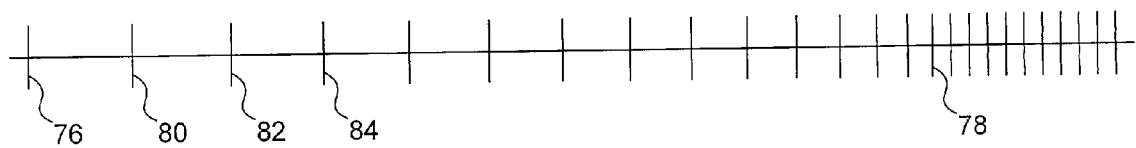
Figure 6:
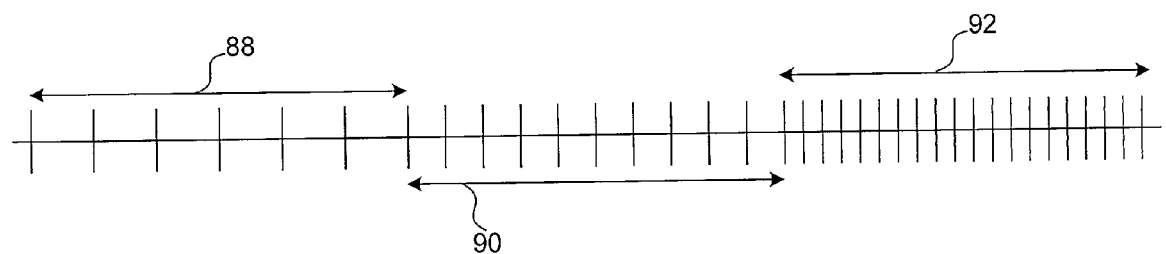

As noted, the rate at which the icons 32 are successively displayed may be increased in response to the user taking a suitable action, such as continuing to hold down the button on the remote control 18 that was used to initiate navigation. For example, as shown in FIG. 5, the rate at which icons 32 are successively displayed may increase from a minimum rate to a maximum rate (preferably at or below the user's recognition threshold) at point 78. In FIG. 5, the display rate is increased gradually. However the display rate 88, 90, 92 may be increased according to a stepwise function, as shown in FIG. 6, in response to a user action, such as continuing to hold down the button for a set period of time or by repeatedly pressing the same or a different button.

Figure 7:
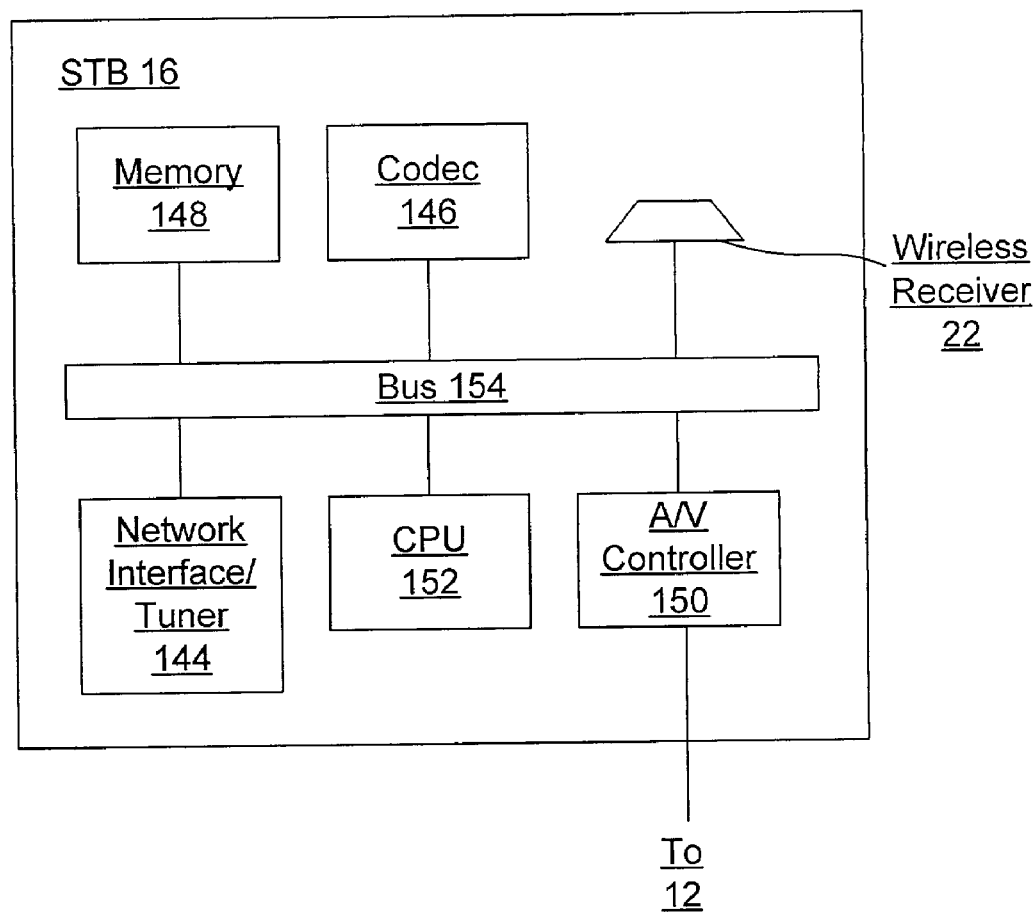
FIG. 7 is a block diagram of physical components of a set-top box (STB)

Referring now to FIG. 7, a block diagram of physical components within the STB 16 is shown. The STB 16 includes a wireless receiver 22 for receiving control signals sent by the wireless transmitter 20 in the remote control 18. The STB 16 also includes a network interface/tuner 144 for receiving an ITV signal (including, for instance, both a broadcast TV signal and other data) from a broadcast center (not shown) over a transmission medium, such as a broadband network. The interface/tuner 144 includes conventional tuning circuitry for receiving, demodulating, and demultiplexing the ITV signal, which may be encoded using MPEG or the like.

The STB 16 also include a codec (encoder/decoder) 146, which serves to decode a data stream received from the broadcast center over the transmission medium. The codec 146 may be implemented in hardware and/or software.

The STB 16 further includes a memory device 148. The memory device 148 may include a random access memory (RAM) for storing temporary data. Alternatively, or in addition, the memory device 148 may include a read-only memory (ROM) for storing more permanent data, such as fixed code and configuration data. For instance, the memory device 148 may include an operating system (OS) for the STB 16, such as Linux® or Windows CE® or XP®. The memory device 148 may also be embodied as a magnetic storage device, such as a hard disk drive.

An audio/video (A/V) controller 150 is provided for converting digital audio/video signals into analog signals for playback/display on the TV 12. The A/V controller 150 may be implemented using one or more physical devices, such as separate graphics and sound controllers. The A/V controller 150 may also include graphics hardware for performing bit-block transfers (bit-blits) and other graphical operations for displaying graphical representations, such as icons 32, on the display screen 14.

A CPU 152 controls the operation of the STB 16, including the other components thereof, which are coupled to the CPU 152 via a bus 154. The CPU 152 may be embodied as a microprocessor, microcontroller, digital signal processor or other device known in the art. For instance, the CPU 152 may be embodied as an Intel® x86 microprocessor. The CPU 152 performs logical and arithmetic operations based on program code stored within the memory device 148.

Of course, FIG. 7 illustrates only one possible configuration of an STB 16. Those skilled in the art will recognize that various other architectures and components may be provided. In addition, various standard components are not illustrated in order to avoid obscuring aspects of the invention.

Figure 8:
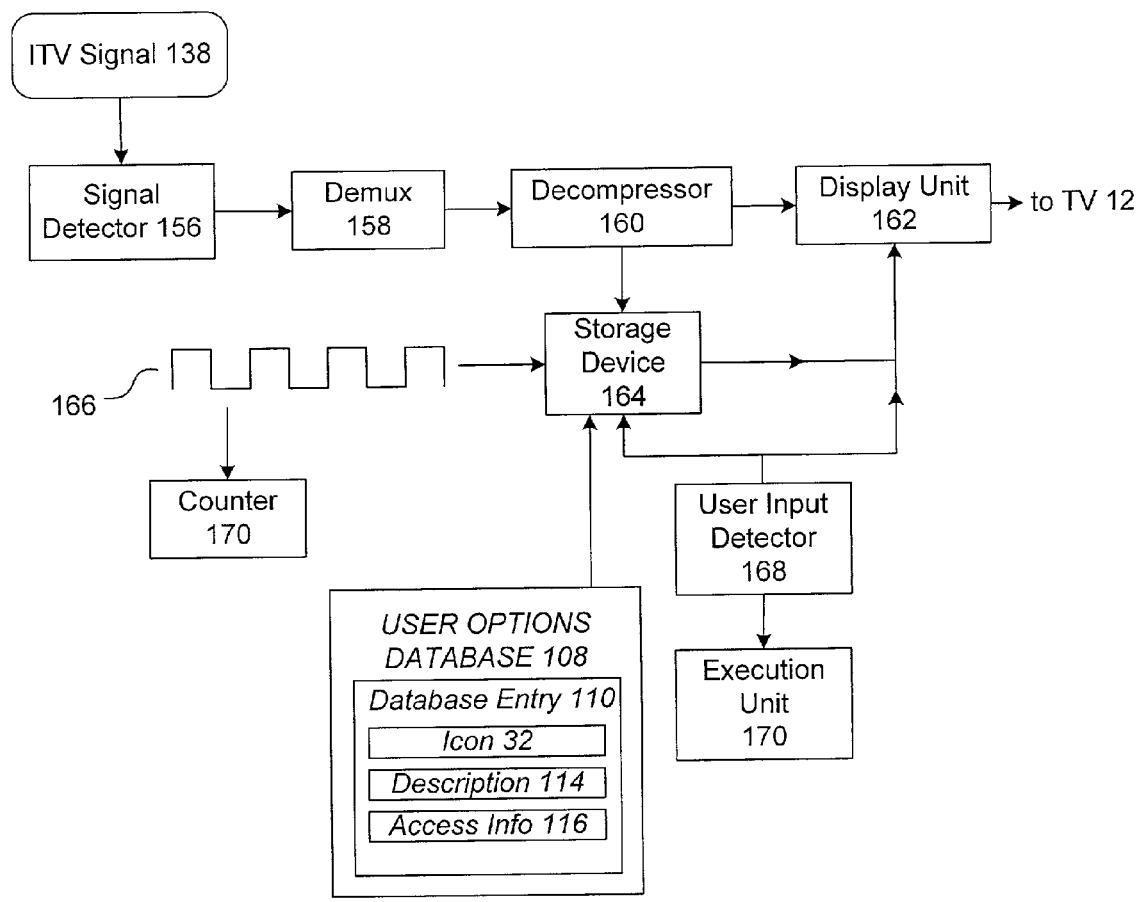
FIG. 8 is a block diagram of logical components of a system for providing focused navigation within a user interface.

Referring now to FIG. 8, a block diagram of logical components within the STB 16 is shown. The depicted logical components may be implemented using one or more of the physical components shown in FIG. 7. Of course, various logical components may be implemented as software modules stored in the memory device 148 and executed by the CPU 152. Those skilled in the art will recognize that various illustrated components may be combined together or integrated with standard components in various configurations without departing from the scope or spirit of the invention.

An ITV signal 138 containing compressed TV signals and other information is received by a signal detector 156, separated by a demultiplexer 158, and decompressed by a decompressor 160. The TV signals are then conveyed to a display unit 162, which performs further processing to convert the TV signals into a suitable format for the TV 12. The other information is routed to a storage device 164, where it is retrieved in synchronization with a clock signal 166 having a periodic clock cycle.

In one embodiment, a user options database 108 is provided, which contains information about various options available to a user. Consistent with the above description, the user options database 108 may include information about any capability of an information system that a user may selectively activate, including, for instance, applications, files, databases, channels, media programs, etc. As discussed in connection with FIG. 8, the user options database 108 may include information about TV programs that may be received and displayed by the STB 16.

Each database entry 110 within the user options database 108 may include a graphical representation 32, such as an icon 32. Other information about the user option may also be provided, such as a description 114 and access information 116. The access information 116 for a TV program may include the channel of the program being (or to be) broadcast, the start time, the end time, and so forth.

In response to a user action to initiate navigation, a navigational control signal is detected by the user input detector 168. In response, two things may happen every N clock cycles. First, the database entry 110 corresponding to the currently selected icon 32 is retrieved from the storage device 164 and delivered to the display unit 162 for processing. Second, the next icon 32 in the sequence 42 is made to be the currently selected icon 32.

The value of N may be any integral value. As described previously, the rate at which the icons 32 are successively displayed may be increased. This may be accomplished by initiating a counter 170 when the navigational control signal is detected by the user input detector 168. The counter 170 increments every M clock cycles, where M is an integer, for as long as the navigational control signal is detected by the user input detector 168. After the counter 170 has reached a set value, the value of N is decreased, which has the effect of accelerating the rate of successive display of icons 32. In one implementation, the value of N may not decrease below a certain value corresponding to a typical user's image recognition threshold.

The values of M and N may be adjusted to implement the gradual and stepwise acceleration discussed previously. For example, high values of M and N correspond to stepwise acceleration as illustrated in FIG. 6, whereas low values of M and N correspond to gradual acceleration as illustrated in FIG. 5.

As discussed previously, a user's delayed response may be automatically compensated for by reverting to a previously displayed icon 32 once the user takes action to discontinue navigation. This may be accomplished by instructing the storage device 164 to retrieve the database entry 110 X positions behind the currently selected icon 32 within the sequence 42 once navigation has been discontinued. The retrieved entry 110 is then delivered to the display unit 162 for processing. The value of X, which may be any integer, corresponds to an anticipated time delay between a user's recognition of a desired icon 32 and the time that the user takes action to discontinue navigation.

As described previously, each database entry 110 within the user options database 108 may include access information 116 such as the channel on which the program is playing, the start time of the TV program, the end time of the TV program, and so forth. This information may be used by the display unit 162 to visually enhance the retrieved TV program for emphasis, as previously illustrated in FIG. 3. Alternatively, the display unit 162 may visually enhance the retrieved TV program in any number of other ways, such as increasing its size.

As noted, the user may select a displayed icon 32 by pressing, for example, a "Select" button 30 on the remote control 18. When an icon 32 is selected, the corresponding user option may be executed by an execution unit 170. For instance, where a user selects an icon 32 corresponding to a particular channel, the execution unit 170 may tune the STB 16 to the selected channel.

Of course, FIG. 8 illustrates only one implementation of the above-described techniques. Various other implementations, using various combinations of hardware and software, may be known to those skilled in the art based on the teachings contained herein.

In view of the foregoing, the present invention offers a number of advantages not available in conventional approaches. In accordance with the invention, graphical representations corresponding to available user options are successively and rapidly displayed within a focus area.

Because navigation is initiated by a single user action, the user need not repeatedly press a button to display each option, as is often the case with conventional television or ITV interfaces. This greatly increases navigation speed, reduces wear on the remote control, and reduces the likelihood of repetitive stress injury of the user's hand.

Likewise, because the graphical representations are all displayed within a single area of the user interface (the focus area), the user need not scan through an arrangement of icons on a desktop, as is typically the case in many conventional PC interfaces. The graphical representations may be displayed at a relatively high rate of speed, while still being within the user's image recognition threshold. Typically, the focused navigation technique of the claimed invention allows a user to more quickly and efficiently locate and select a desired option than conventional approaches.

While specific embodiments and applications of the present invention have been illustrated and described, it is to be understood that the invention is not limited to the precise configuration and components disclosed herein. Various modifications, changes, and variations apparent to those skilled in the art may be made in the arrangement, operation, and details of the methods and systems of the present invention disclosed herein without departing from the spirit and scope of the invention.

What is claimed is:

1. A method for navigating a plurality of options within a user interface of an interactive television system, the method comprising:

storing a graphical representation of each of the plurality of options;

in response to a single user action, scrolling a sequence of the graphical representations in a straight line through a single, non-moving focus area of the user interface, the focus area being located in an intermediate position between two ends of the straight-line sequence; and in response to a terminating action by the user, discontinuing the scrolling of graphical representations to show a particular graphical representation of an option in the focus; and testing the user's ability to identify a test image within the sequence of images displayed at different rates to automatically determine the user's maximum image recognition threshold and set the rate at which the sequence is scrolled based on that threshold.

2. The method of claim 1, wherein at least one graphical representation comprises an icon.

3. The method of claim 1, wherein at least one graphical representation comprises an image.

4. The method of claim 1, wherein at least one graphical representation comprises a video frame.

5. The method of claim 1, further comprising replacing the graphical representation in the focus area after the terminating action with a reduced-size version of a television program being shown on the corresponding option prior to an explicit selection action by the user to display the television program.

6. The method of claim 1, wherein a displayed graphical representation occupies between about one-fifth and about one-fourth of a display screen on which the user interface is displayed.

7. The method of claim 1, wherein the graphical representations are successively displayed in a center portion of the user interface.

8. The method of claim 1, wherein the single user action comprises pressing and holding down a control on a remote control.

9. The method of claim 8, wherein the terminating action comprises releasing the control on the remote control.

10. The method of claim 1, wherein the single user action comprises pressing and releasing a first button on a remote control.

11. The method of claim 10, wherein the terminating action comprises pressing and releasing the first button a second time.

12. The method of claim 10, wherein the terminating action comprises pressing and releasing a second button on the remote control.

13. The method of claim 1, further comprising:
visually enhancing the graphical representation of the option in the focus area in response to the terminating action prior to an explicit selection action by the user.

14. The method of claim 13, wherein visually enhancing comprises displaying text within the user interface that is descriptive of the corresponding option.

15. The method of claim 13, wherein visually enhancing comprises enlarging the graphical representation of the option in the focus area.

16. The method of claim 13, wherein visually enhancing comprises changing the graphical representation of the option in the focus area from a static image to a moving video image.

17. The method of claim 1, wherein discontinuing comprises compensating for a user's reaction time between observing a desired graphical representation in the focus area and taking the terminating action by reverting to a graphical representation other than the graphical representation displayed at the time the terminating action was detected, the reverted-to graphical representation being a previously-displayed graphical representation earlier in the sequence.

18. The method of claim 1, further comprising:
presenting a television program being shown on a broadcast channel corresponding to the graphical representation in the focus area in response to an explicit selection action by the user.

19. The method of claim 18, wherein the selection action comprises activating a selection control on a remote control.

20. The method of claim 18, wherein the selection action comprises delaying to activate a control on a remote control for a set amount of time.

21. The method of claim 1, further comprising:
increasing a rate at which the graphical representations are successively displayed in response to a user command.

22. The method of claim 21, wherein the user command comprises holding down a button on a remote control.

23. The method of claim 22, wherein the rate is increased according to a stepwise function based on how long the button is held down, such that a plurality of graphical representations are shown at each of a plurality of increasing rates dictated by the stepwise function.

24. The method of claim 21, wherein the user command comprises pressing a button on a remote control.

25. The method of claim 24, wherein the rate is increased each time the button is pressed.

26. The method of claim 1, wherein the graphical representations are successively displayed at a maximum rate approximating a user's maximum image recognition threshold.

27. The method of claim 26, wherein the graphical representations are successively displayed at a user-selected rate between about six representations per second and about eight representations per second.

28. The method of claim 1, further comprising:
displaying at least a portion of a previously-displayed graphical representation outside of the focus area in a first location; and
displaying at least a portion of an ensuing graphical representation outside of the focus area in a second location.

29. The method of claim 28, wherein the first location is positioned above the focus area, and the second location is positioned below the focus area.

30. The method of claim 28, wherein the first location is positioned to the left of the focus area, and the second location is positioned to the right of the focus area.

31. A system for navigating a plurality of options within a user interface, the system comprising:
a storage device to store a graphical representation of each of a plurality of options;
a user input detector to detect user actions; and
a display unit to scroll, in response to a single user action, a sequence of the graphical representations in a straight line through a single, non-moving focus area of the user interface, the focus area being located in an intermediate position between two ends of the straight-line sequence; wherein the display unit is further to discontinue, in response to a terminating action by the user, the scrolling of graphical representations to show a particular graphical representation of an option in the focus area, wherein the display unit is further to test the user's ability to identify a test image within a sequence of images displayed at different rates to automatically determine the user's maximum image recognition threshold and set the rate at which the sequence is scrolled based on that threshold.

32. The system of claim 31, wherein at least one graphical representation comprises an icon.

33. The system of claim 31, wherein at least one graphical representation comprises an image.

34. The system of claim 31, wherein at least one graphical representation comprises a video frame.

35. The system of claim 31, wherein the display unit is further to replace the graphical representation in the focus area after the terminating action with a reduced-size version of a television program being shown on a corresponding broadcast channel prior to an explicit selection action by the user to display the television program.

36. The system of claim 31, wherein a displayed graphical representation occupies between about one-fifth and about one-fourth of a display screen on which the user interface is displayed.

37. The system of claim 31, wherein the graphical representations are successively displayed in a center portion of the user interface.

38. The system of claim 31, wherein the display unit is further to visually enhance the graphical representation of the desired option in response to the terminating action prior to an explicit selection action by the user.

39. The system of claim 31, wherein the graphical representation is visually enhanced by displaying text within the user interface that is descriptive of the corresponding option.

40. The system of claim 39, wherein the graphical representation is visually enhanced by changing the graphical representation of the option in the focus area.

41. The system of claim 39, wherein the graphical representation is visually enhanced by enlarging the graphical representation of the option in the focus area from a static image to a moving video image.

42. The system of claim 31, wherein the display unit is further to compensate for a user's reaction time between observing a desired graphical representation in the focus area and taking the terminating action by reverting to a graphical representation other than the graphical representation displayed at the time the terminating action was detected, the reverted-to graphical representation being a previously-displayed graphical representation.

43. The system of claim 31, further comprising:
a selection unit to present a television program being shown on a broadcast channel corresponding to the graphical representation in the focus area in response to an explicit selection action by the user being detected.

44. The system of claim 43, wherein the selection action comprises activating a selection control on a remote control.

45. The system of claim 43, wherein the selection action comprises delaying to activate a control on a remote control for a set amount of time.

46. The system of claim 31, wherein the display unit is further to increase a rate at which the graphical representations are successively displayed in response to a user command.

47. The system of claim 46, wherein the user command comprises holding down a button on a remote control.

48. The system of claim 47, wherein the rate is increased according to a stepwise function based on how long the button is held down, such that a plurality of graphical representations are shown at each of a plurality of increasing rates dictated by the stepwise function.

49. The system of claim 46, wherein the user command comprises pressing a button on a remote control.

50. The system of claim 49, wherein the rate is increased each time the button is pressed.

51. The system of claim 31, wherein the graphical representations are successively displayed at a rate approximating a user's maximum image recognition threshold.

52. The system of claim 51, wherein the graphical representations are successively displayed at a user-selected rate between about six representations per second and about eight representations per second.

53. The system claim 31, wherein the display unit is further to display at least a portion of a previously-displayed graphical representation outside of the focus area in a first location and to display at least a portion of an ensuing graphical representation outside of the focus area in a second location.

54. The system of claim 53, wherein the first location is positioned above the focus area, and the second location is positioned below the focus area.

55. The system of claim 53, wherein the first location is positioned to the left of the, focus area, and the second location is positioned to the right of the focus area.

56. A method for navigating a plurality of options within a user interface, the methods comprising:
storing a graphical representation of each of a plurality of options associated with an information system;
testing a user's ability to identify a test image within a sequence of images displayed at different rates to automatically determine the user's maximum image recognition threshold;
in response to the user holding down a button on a remote control, successively displaying the graphical representations in a focus area of the user interface in sequence at a rate approximating the user's maximum image recognition threshold;
increasing a rate at which the graphical representations are successively displayed according to a stepwise function based on how long the button is held down, such that a plurality of graphical representations are shown at each of a plurality of increasing rates dictated by the stepwise function; and
in response to the user releasing the button on the remote control, discontinuing the successive display of graphical representation to show a particular graphical representation of an option.

57. The method of claim 56, wherein discontinuing comprises compensating for a delay between a time at which the user observes a desired graphical representation in the focus area during the successive display and a time at which the button is released by reverting to a graphical representation other than the graphical representation displayed at the time the user action was detected, the reverted-to graphical representation being a previously-displayed graphical representation.

58. The method of claim 56, wherein the options comprise broadcast channels, the method further comprising replacing the graphical representation in the focus area after the button is released with a reduced-size version of a television program being shown on a corresponding broadcast channel prior to an explicit selection action by the user to display the television program.

59. A method for navigating a plurality of options within a user interface of an interactive television system, the method comprising:
storing a graphical representation of each of the plurality of options;
in response to a single user action, successively displaying the graphical representations in a single, non-moving focus area of the user interface, wherein the graphical representations are successively displayed at a rate based on the user's maximum image recognition threshold, which threshold is determined by testing the user's ability to identify an image within a sequence of images presented at different rates;
displaying with each successively displayed graphical representation at least a portion of a previously-displayed graphical representation on one side of the focus area and at least a portion of an ensuing graphical representation on an opposite side of the focus area, such that the graphical representations are displayed in a straight line, wherein the focus area is located in an intermediate position between the graphical representations on either side; and
in response to a terminating action by the user, discontinuing the successive display of graphical representations to show a particular graphical representation of an option.

* * * * *